३,७९९,७६२
**SLAG CONDITIONER FOR IRON AND
STEEL PROCESSES**
Boyd E. Cass, Ligonier, Pa., assignor to Carad, Inc.
No Drawing. Filed May 17, 1971, Ser. No. 144,228
Int. Cl. C21c 7/00; C22b 9/10
U.S. Cl. 75—55                                    10 Claims

ABSTRACT OF THE DISCLOSURE

A slag conditioner for use in iron and steel processes to condition the slag and facilitate the dissolution of lime in the slag comprising essentially constituents of calcium fluoride, and manganese and iron in the form of an oxide or carbonate. Fines of the constituents are briquetted with a binder which quickly yields its binding properties upon subjection to high temperatures and an addition of no more than approximately twenty percent by weight of an oxide of boron, while not necessary, may be made to further enhance the characteristics thereof. The manganese is preferably supplied from waste or by-product dust from the manufacturer of ferromanganese.

BACKGROUND OF THE INVENTION

(1) Field of the invention

This invention relates generally to the production of iron and steel and more particularly to increasing the fluidity of oxidizing and refining slags in processes for producing iron and steel by use of a slag conditioner.

(2) Discussion of the prior art

In smelting processes, such as, in the refining of steel, it is the principal function of fluxes to condition the slag so that it is more active chemically and will promote the impurities contained in the molten bath, such as, phosphorus and sulfur, more easily fusible so that they may be more readily removed or combined with another substance in preference to the metal in the bath. The secondary function of the flux is to furnish a substance with which these undesirable elements or compounds may combine in preference to the metal. Slag conditioners are also added to make the slag more active chemically and promote dissolution of the lime flux in the slag.

The principal basic slag flux is "burnt lime." In the practice of the basic oxygen furnace process, "burnt lime" is added to the silicate slag a shorter time after the oxygen blowing process begins. Fluorspar is commonly added as a slag conditioner to the slag to increase its fluidity and to make the slag more fusible. The fluorspar or slag conditioner facilitates the dissolution of the lime in the slag so that the smelting or refining process may be carried out effectively and initiated as soon as possible.

The addition of fluorspar, however, is becoming less desirable because of its increasing scarcity and the inability to obtain good metallurgical grades of fluorspar in large quantities. Also, fluorspar tends to have a corrosive action on the refractory lining of the furnace when used alone in large quantities as a fluxing agent to facilitate the dissolution of the lime in slag.

It has therefore been a prime objective of the steel making industry to find a slag conditioner which is less expensive than fluorspar and which will be at least as effective in rendering the slag more fusible and to facilitate the dissolution of lime in slag.

In substitution of fluorspar as found in nature, it has been suggested that aluminum drosses as produced in the smelting of aluminum be used. Among others, oxides of boron and olivine have also been suggested as substitutes for fluorspar. However, these substitutes for fluorspar have been found to be either impractically expensive or overactive to the extent that their corrosive effect on the furnace refractory lining is undesirable or they possess materials and qualities which, when not properly regulated may impart detrimental properties to the molten bath.

SUMMARY OF THE INVENTION

Accordingly, it is the principal object of the present invention to provide a novel flux and slag conditioner which will fluidize the slag and facilitate the dissolution of lime in the slag more readily than fluorspar alone, gives longer life to refractory linings, and which is less expensive than those slag conditioners presently available on the market.

The slag conditioner of the present invention comprises essentially a combination of constituents of calcium fluoride, and manganese and iron in the form of an oxide or carbonate. In addition thereto a small amount (no more than approximately twenty percent by weight) of an oxide of boron may be beneficially included. However, while the effects of this addition are beneficial, it is by no means necessary.

The slag conditioner is preferably provided in briquetted form consisting of the fines of the major constituents in commonly found compound forms cohered with a binder which quickly yields its binding properties upon subjection to high temperatures. The preferred portions of the major constituents in relation to each other are as follows:

|      | Units |
|------|-------|
| $CaF_2$ | 10–55 |
| Mn   | 5–20  |
| Fe   | 5–25  |

The slag conditioner of the present invention is in addition novel in that a waste by-product manganese dust from the manufacture of ferromanganese is preferably recovered and employed to supply the manganese content thereby providing a very effective, yet inexpensive, slag conditioner.

Other objects and advantages will become apparent upon reading the following detailed description.

DESCRIPTION OF THE INVENTION

The basic constituents of calcium fluoride, manganese and iron are generally and preferably provided in the form of fluorspar or a slurry by-product containing $CaF_2$ from the manufacture of fluorine containing chemicals, manganese ore or flue dust collected from a ferromanganese producing furnace or the like, and iron ore, scale or other source of iron oxide respectively.

In a typical example of the slag conditioner of the present invention, 15–80 parts per hundred of fluorspar fines are mixed with 8–30 parts per hundred of manganese dust (recovered ferromanganese flue dust) and 8–35 parts per hundred scale or iron oxide fines. This mixture is then further mixed with a binder which quickly yields its cohesion properties upon exposure to high temperatures such as molasses and lime, tall oil or lignite, and the mixture is then briquetted.

By providing the slag conditioner in the form of briquetted fines bound with a binder as taught by the present invention, the lump form of the briquette permits it to sink into solution with the slag without being blown out the flue and also provides a component particle size which immeasurably improves the reaction rate effect of the agglomerated chemicals for putting the lime into solution. These fines thus intersperse and get into solution faster than lump form. In other words, the binder holds the particles together in lump form which permits introduction of the slag conditioner into the slag without loss. Upon contact with the slag, the binder yields so that the briquette constituents are once again in a fine particle state which will readily combine with the slag to get the desired effects at a much greater rate than possible when the fluxes are added in lump form.

In actual experimental use, an oxide of boron was also added in the form of rasorite, in the amount of no more than about thirty-two parts per hundred (approximately twenty parts per hundred of oxide of boron).

It was found that the resultant briquette was in a form which was readily transportable and provided a slag conditioner which was at least as effective than fluorspar alone in lowering the melting point of the slag and in fluidizing the same and in making it more fusible to facilitate the dissolution of the lime and expedite the refining process. It was also found that the furnace refractory lining life time was extended in comparison to the refractory life time found when using fluorspar or an oxide of boron alone, for example.

Thus the slag conditioning briquette of the present invention provides a combination of chemicals, which in their combined form as taught therein, have proven effective in improving the solution rate of lime in steel making slags, provides component particle sizes of material that measurably improve the reaction rate effect of the agglomerated chemicals for putting the lime into solution, and overcomes the disadvantages of adding small particles in the slag while at the same time providing an agglomerated size that can be effectively and efficiently handled and which quickly disintegrates when introduced into the steel making process.

The calcium fluoride content may also be provided in the form of a by-product such as that produced from the manufactuer of aluminum and/or other chemical processes. In such processes, an effluent flue dust is produced which contains fluorine. This effluent flue dust is collected with water and treated with lime whereupon the fluorine is removed in the form of a waste slurry. These slurries are composed largely of calcium fluoride and may thus also be used in place of natural fluorspar.

In place of the manganese flue dust, one may utilize manganese ore fines depending upon the availability and price.

By mixing the proper combination of fluorspar or a calcium fluoride by-product with manganese oxide from manganese dust or manganese ore, and iron oxide from scale, one may obtain the requisite constituent units of $CaF_2$, Mn and Fe in relation to each other; namely, 10–55 units $CaF_2$ with 5–20 units Mn and 5–25 units Fe.

The briquetted slag conditioner may of course be added to the slag either at the same time that the lime is added, or soon thereafter. In fact, the lime itself may be included in the briquette.

Although each of the constituents of the slag conditioner of the present invention have been previously known to have been added or existed naturally in the slag separately in one form or another, no suggestion has heretofore been made or realized as to benefits obtainable by the use of the specific chemical composition or combination of the slag conditioner of the present invention which proves to be more effective in the combination or composition relationship as taught herein than in any prior use made of these elements in previously known slag conditioners. For example, fluorspar alone has been used widely in the past. It has also been known that an oxide or carbonate of manganese and an oxide or carbonate or iron may be beneficial agents in a slag as noted in the patent to Charles B. Francis, No. 2,173,535. However, none of these previously suggested slag conditioners prove to be as economical and effective as that taught by the present invention which incorporates the advantages of all these chemicals in particular combination which provides results better than the effects produced by any of these materials individually. The briquette or slag conditioner composition of the present invention when introduced into the slag, lowers its melting point to a lower degree than any one single constituent will permit and unexpectedly provides better all-around results than any flux or conditioner heretofore in use.

As previously stated, the addition of an oxide of boron is also beneficial when added in an amount of not more than approximately twenty percent. Boron may be added in the form of rasorite, colemanite, boric acid, anhydrous borax, boron trioxide, calcium metaborate, ulexite, inderite, kernite or kurnakovite.

It is also interesting to note that the benefits of the inclusion of an oxide of boron to help fluidize the slag may be obtained without undue concern as to the possibility of one incorporating too great an amount of the oxide of boron such that it is detrimental to the properties of the metal being refined and such that the refractory lining of the furnace is unduly corroded, which is the expected result when an oxide of boron is used alone in place of fluorspar. It is possible that an oxide of boron when used alone may be introduced into the furnace in larger quantities than desired whereupon the properties of the steel will be affected detrimentally, an oxide of boron being a very active flux which in addition has been thought to cause a high corrosion rate on the refractory lining.

Thus the slag conditioner of the present invention provides a means of getting the lime into solution at a rate which is at least as fast as that possible by other slag conditioners heretofore known with the added advantage that the refractory life of the furnace is lengthened. Ironically, not only is the combination of constituents as taught by the present invention more effective, but it provides a slag conditioner which is economically more feasible than any other effective slag conditioner heretofore known.

The flux and conditioner of the present invention is also additionally unique and novel in that it makes effective and efficient use of some products or by-products which would otherwise be considered waste.

I claim:

1. The method of facilitating the dissolution of the lime content in a basic steel refining slag overlying molten steel in a furnace comprising the steps of charging to the lime containing steel refining slag an additive compound consisting essentially of approximately 10–55 units of calcium fluoride, approximately 5–20 units of manganese and approximately 5–25 units of iron, said units of inclusion for each constituent being relative one to the other and maintaining the steel molten for dissolution of the lime in the slag to refine the molten steel.

2. The method of claim 1 wherein said manganese and iron are present in the form of an oxide or carbonate.

3. The method of claim 2 wherein said additive compound is briquetted prior to introduction into the slag.

4. The method of claim 3 wherein said briquetted compound is bound together by a binder which immediately yields its binding properties upon subjection to the high temperatures found in ferrous metal refining slags.

5. The method of claim 3 wherein said binder includes molasses.

6. The method of claim 4 wherein at least a portion of said lime is included directly in said briquetted compound in particulate form.

7. The method of claim 1 wherein not more than 20 units of an ozide of boron are included in said additive compound.

8. The method of claim 1 wherein said oxide of boron is one or more selected from the group consisting of rasorite, colemanite, boric acid, anhydrous borax, boron trioxide, calcium metaborate, ulexite, inderite, kernite and kurnakovite.

9. The method of claim 1 wherein the calcium fluoride in said additive compound is present in the form of fluorspar fines or as by-product fines from the manufacture of aluminum.

10. The method of claim 1 wherein the manganese in said additive compound is present in the form of manganese ore or flue dust collected from a ferromanganese blast furnace.

References Cited

UNITED STATES PATENTS

| | | | |
|---|---|---|---|
| 1,975,084 | 10/1934 | Davies | 75—53 X |
| 2,593,554 | 4/1952 | Graf | 75—53 |
| 2,025,425 | 12/1935 | Smith | 75—53 |
| 2,159,977 | 5/1939 | Nicholas | 75—54 X |
| 3,574,597 | 4/1971 | Lewis et al. | 75—53 |
| 2,079,848 | 5/1937 | Francis | 75—54 X |
| 2,173,535 | 9/1939 | Francis | 75—54 X |
| 3,004,847 | 10/1961 | Lambert et al. | 75—52 |
| 3,172,756 | 3/1965 | Bengtsson | 75—52 |
| 2,767,079 | 10/1956 | Perrin | 75—54 |
| 3,258,328 | 6/1966 | Goss | 75—53 |
| 3,276,860 | 10/1961 | Lintz | 75—55 |

FOREIGN PATENTS

| | | | |
|---|---|---|---|
| 787,441 | 12/1957 | Great Britain | 75—60 |

L. DEWAYNE RUTLEDGE, Primary Examiner

P. D. ROSENBERG, Assistant Examiner

U.S. Cl. X.R.

75—51, 52, 54, 94